(12) United States Patent
Levi

(10) Patent No.: US 12,201,241 B1
(45) Date of Patent: Jan. 21, 2025

(54) ELECTRIC SPICE GRINDER WITH DIGITAL THERMOMETER

(71) Applicant: Guy Levi, Dania, FL (US)

(72) Inventor: Guy Levi, Dania, FL (US)

( * ) Notice: Subject to any disclaimer, the term of this patent is extended or adjusted under 35 U.S.C. 154(b) by 0 days.

(21) Appl. No.: 18/807,711

(22) Filed: Aug. 16, 2024

(51) Int. Cl.
  *A47J 42/36* (2006.01)
  *A47J 42/40* (2006.01)
  *A47J 42/46* (2006.01)
  *G01K 1/02* (2021.01)
  *G01K 1/14* (2021.01)

(52) U.S. Cl.
  CPC .............. *A47J 42/36* (2013.01); *A47J 42/40* (2013.01); *A47J 42/46* (2013.01); *G01K 1/028* (2013.01); *G01K 1/14* (2013.01); *A47J 2202/00* (2013.01); *G01K 2207/06* (2013.01); *G01K 2215/00* (2013.01)

(58) Field of Classification Search
  None
  See application file for complete search history.

(56) References Cited

U.S. PATENT DOCUMENTS

| | | | |
|---|---|---|---|
| 3,485,416 A | 12/1969 | Fohrman | |
| 2006/0203878 A1* | 9/2006 | Pearl | G01K 1/024 374/E1.004 |
| 2020/0061557 A1 | 2/2020 | Bertsch | |
| 2020/0196801 A1* | 6/2020 | McCormack | G01K 1/14 |
| 2020/0375401 A1* | 12/2020 | Yang | A47J 43/0711 |
| 2022/0142399 A1* | 5/2022 | Ludwig | A47J 43/046 |
| 2022/0240723 A1* | 8/2022 | Sergyeyenko | A47J 43/044 |
| 2023/0039557 A1 | 2/2023 | Veelo et al. | |
| 2023/0194362 A1* | 6/2023 | Stein | G01K 1/14 374/141 |

FOREIGN PATENT DOCUMENTS

| | | |
|---|---|---|
| CN | 110831469 B | 5/2022 |
| KR | 102313144 B1 * | 10/2021 |

OTHER PUBLICATIONS

Finamill, USB Rechargeable Spice Grinder, retrieved from Internet, retrieved on Aug. 16, 2024, <URL: https://www.finamill.com/products/finamill-starter-pack-usb-rechargeable>.

* cited by examiner

Primary Examiner — Debra M Sullivan
Assistant Examiner — P Derek Pressley

(57) ABSTRACT

An electric spice grinder with digital thermometer is an apparatus that dispenses milled spices automatically and includes a digital thermometer that can be used to monitor the temperature of food products. The apparatus includes a grinder housing, a food thermometer, a grinder mechanism, a portable power source, and a controller. The grinder housing corresponds to the main structure that houses the rest of the components in a portable and ergonomic way. The food thermometer can be used to monitor the temperature of the desired food product separate from the grinder housing. The grinder mechanism corresponds to the motorized mechanism that dispenses a desired amount of milled spice at a desired grind level. The portable power source provides the voltage necessary to sustain the operation of the food thermometer, the grinder mechanism, and the controller. The controller enables the operational control of the food thermometer and the grinder mechanism.

18 Claims, 14 Drawing Sheets

ELECTRIC SPICE GRINDER WITH DIGITAL THERMOMETER

FIELD OF THE INVENTION

The present invention relates generally to cooking appliances and digital devices. More specifically, the present invention discloses an electric spice grinder equipped with a detachable digital thermometer.

BACKGROUND OF THE INVENTION

Nowadays, several cooking tools and appliances have been made available to help people cook more efficiently with less effort. In some cases, many traditional devices have been automated to allow the devices to be easily utilized by anyone. For example, new automated spice grinders have been made available to allow the user to dispense a desired amount of spice that has been grinded by the device. Similarly, digital food thermometers have been made available to help the user monitor the temperature of food being cooked more easily. However, having many separate tools in the kitchen while cooking can be an inconvenience and could even pose a safety hazard. There have been attempts to reduce the amount of tools the user needs to have present while cooking by combining different devices into a single device/system. Unfortunately, no attempts have been made to provide a device that combines the features of an electric spice grinder and a digital thermometer.

Therefore, an objective of the present invention is to provide an electric spice grinder with a digital thermometer that combines the features of an electric spice grinder with the features of a food thermometer. The present invention implements a novel grinder structure that accommodates the motorized features of the electric spice grinder as well as the features of the food thermometer. Another objective of the present invention is to provide an electric spice grinder with a portable structure that houses the digital thermometer in such a way that the digital thermometer can be removably attached to the electric spice grinder. The present invention allows the digital thermometer to be removed from the electric spice grinder to monitor the temperature of the food product being cooked. Additional features and benefits of the present invention are further discussed in the sections below.

SUMMARY OF THE INVENTION

The present invention discloses an electric spice grinder with a digital thermometer that combines the features of an electric spice grinder with the features of a digital thermometer. The electric spice grinder of the present invention is customized to house the digital thermometer in such a way that the digital thermometer can be removably attached to the electric spice grinder. This way, the digital thermometer can be removed from the electric spice grinder to monitor the food product being cooked without exposing the electric spice grinder to high temperatures. The electric spice grinder can also be customized to house a user interface to allow the user to monitor the temperature measurements obtained by the digital thermometer from the housing of the electric spice grinder. Further, the electric spice grinder can be designed to mill different spices to different grind levels by implementing different adjustment features that the user can adjust. In other embodiments, different features can be implemented to increase the functionality of the present invention.

DETAILED DESCRIPTION OF THE INVENTION

Figure 1:
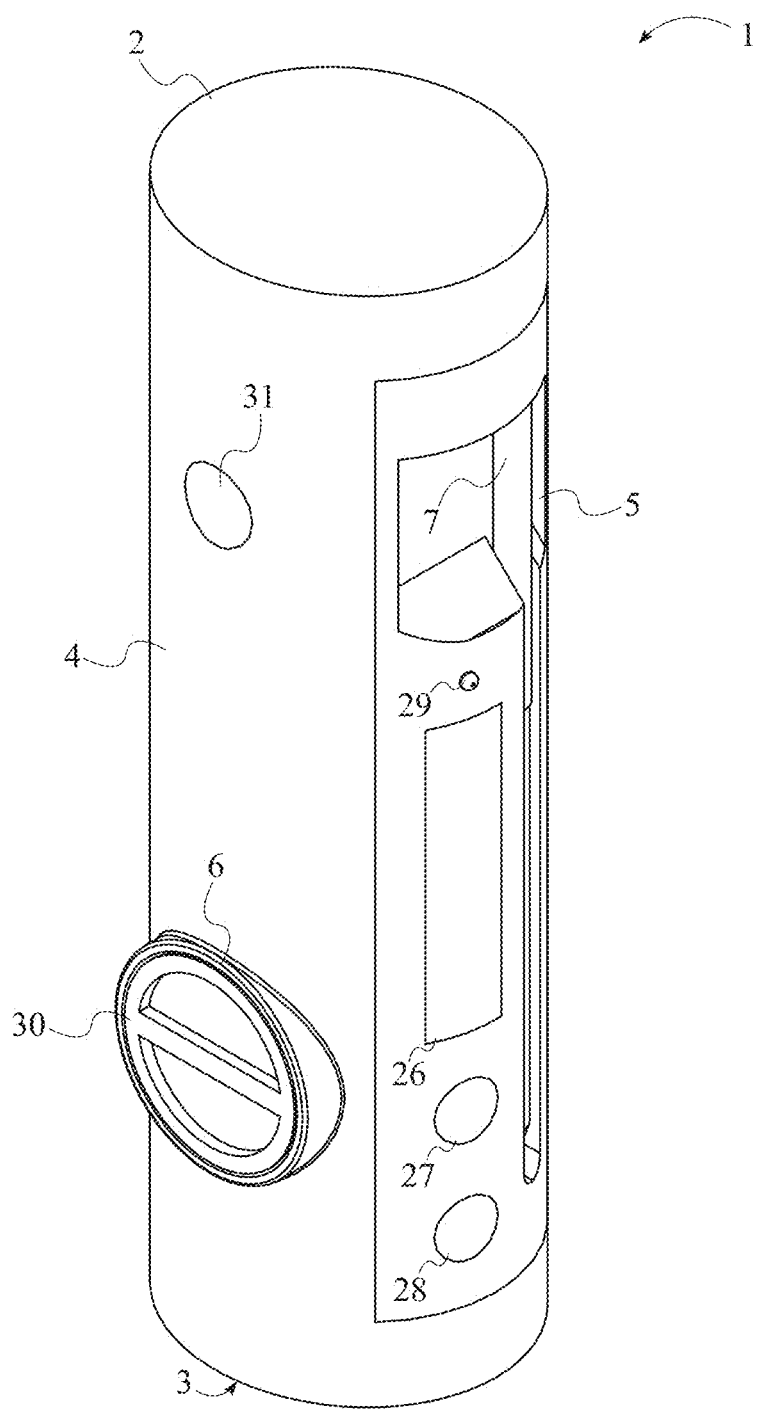
FIG. 1 is a top-front-left perspective view of the present invention.
Figure 2:
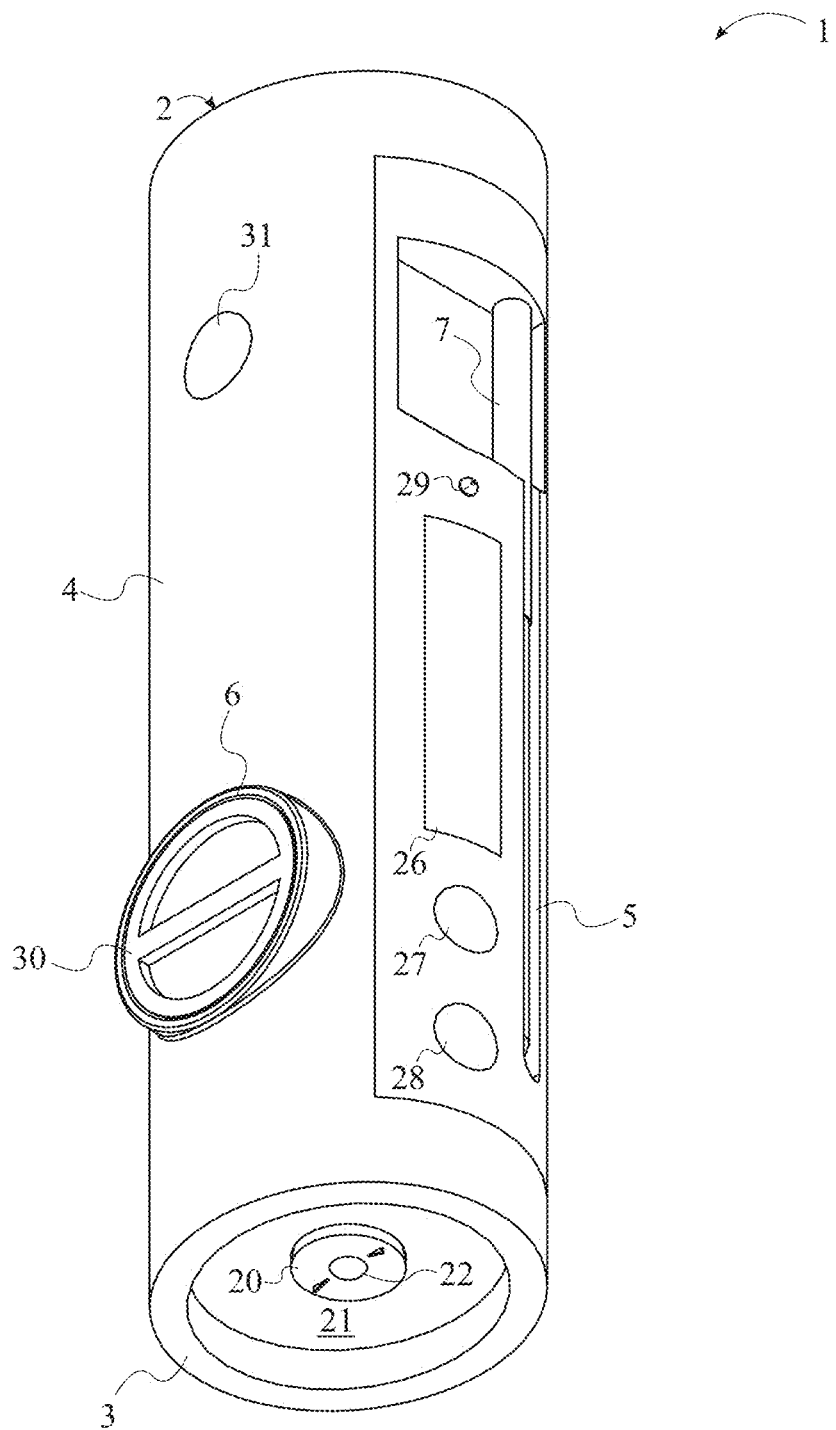
FIG. 2 is a bottom-front-left perspective view of the present invention.
Figure 3:
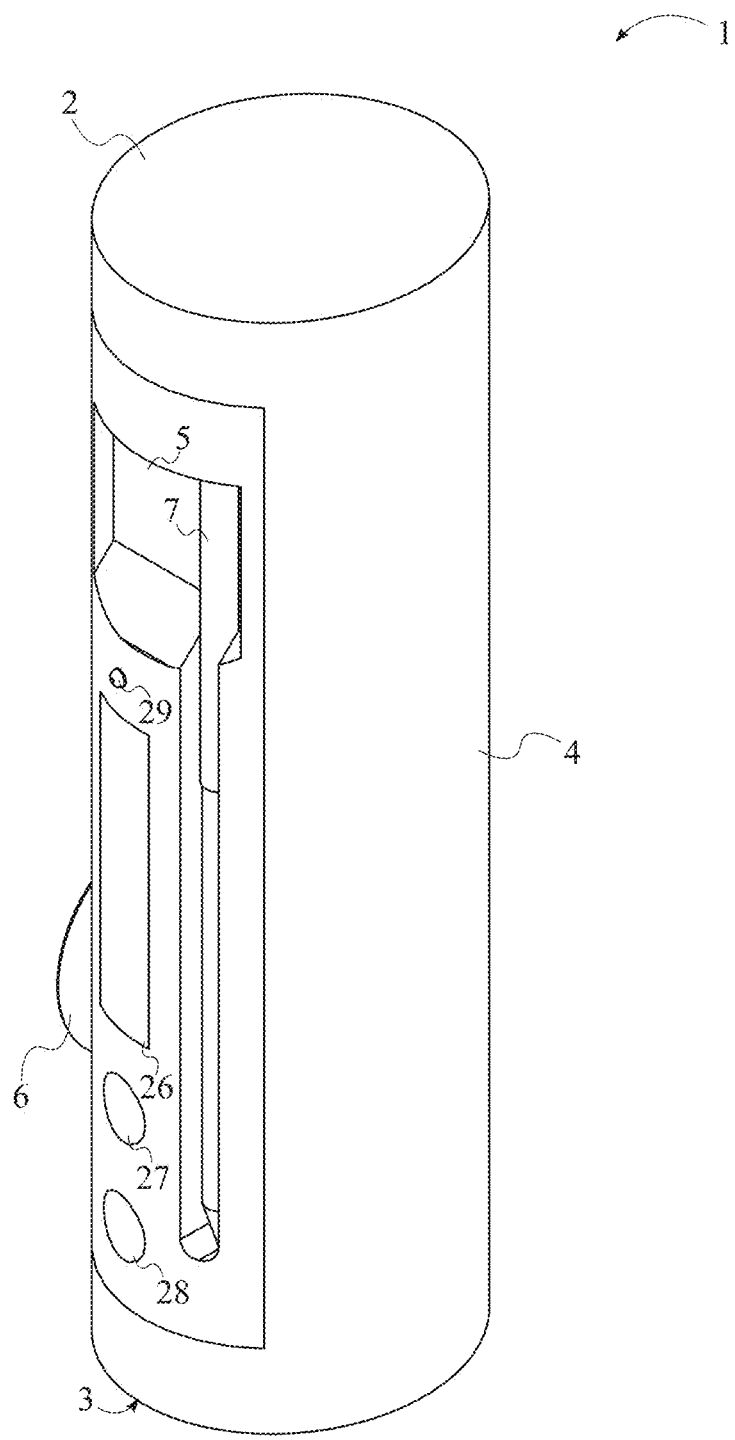
FIG. 3 is a top-rear-left perspective view of the present invention.
Figure 4:
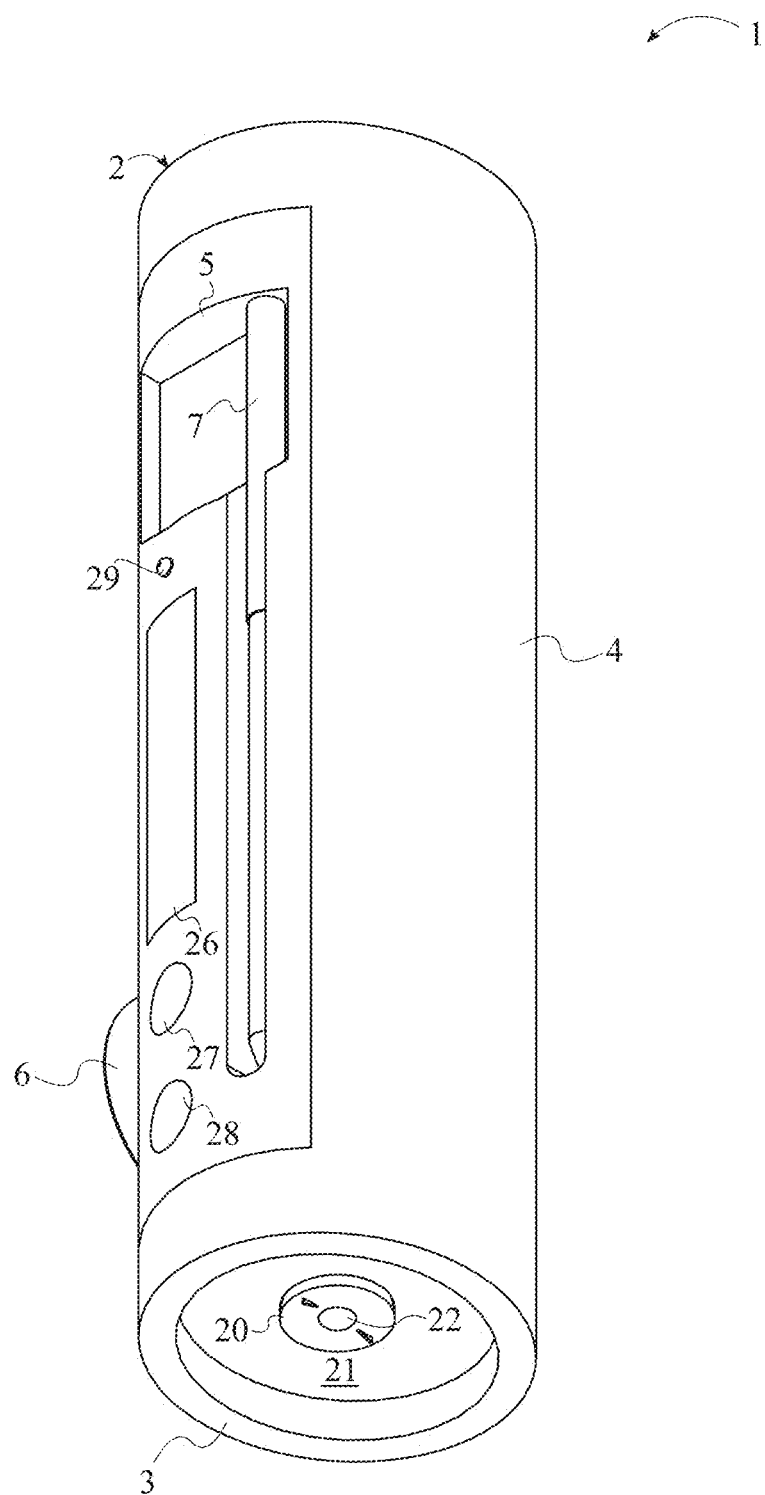
FIG. 4 is a bottom-rear-left perspective view of the present invention.
Figure 5:
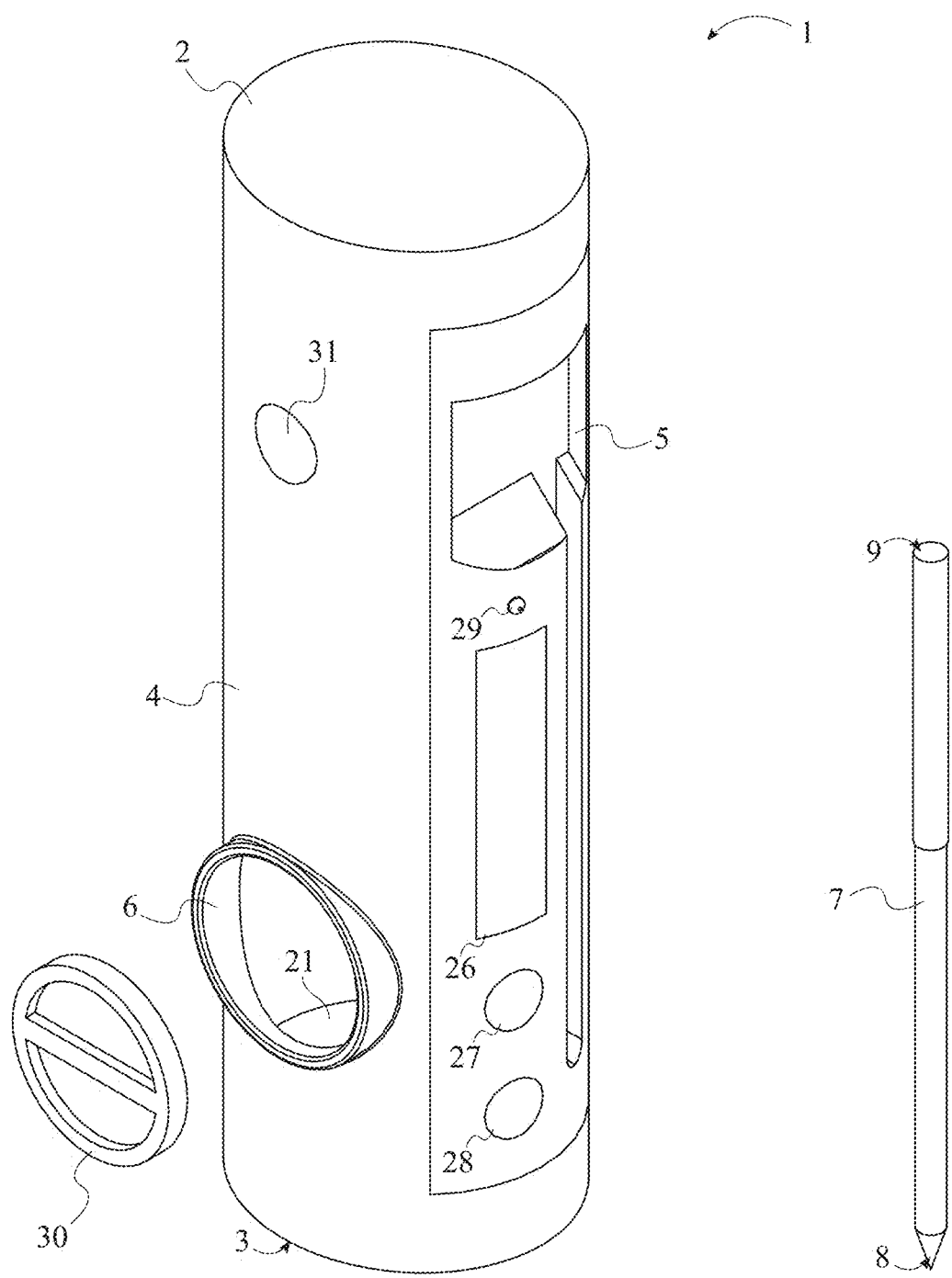
FIG. 5 is a top-front-left exploded perspective view of present invention.
Figure 6:
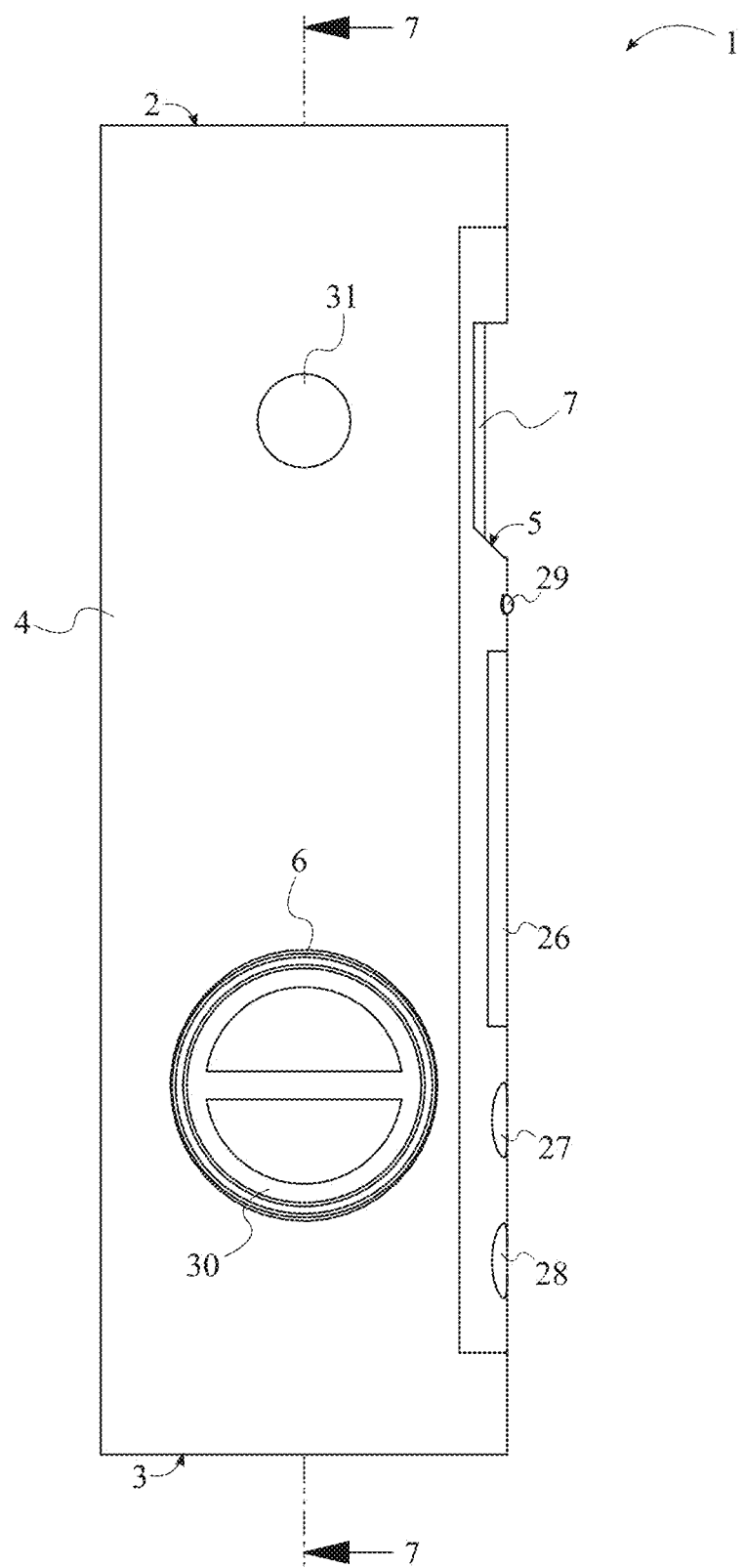
FIG. 6 is a front view of the present invention.
Figure 7:
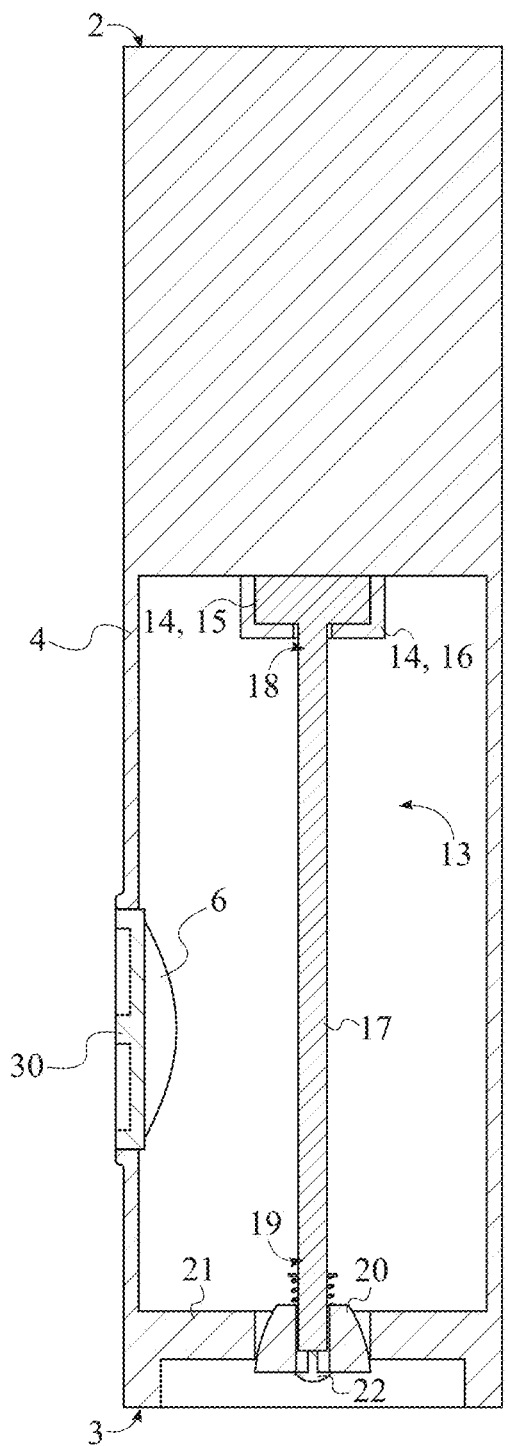
FIG. 7 is a vertical cross-sectional view taken along line 7-7 shown in FIG. 6.
Figure 8:
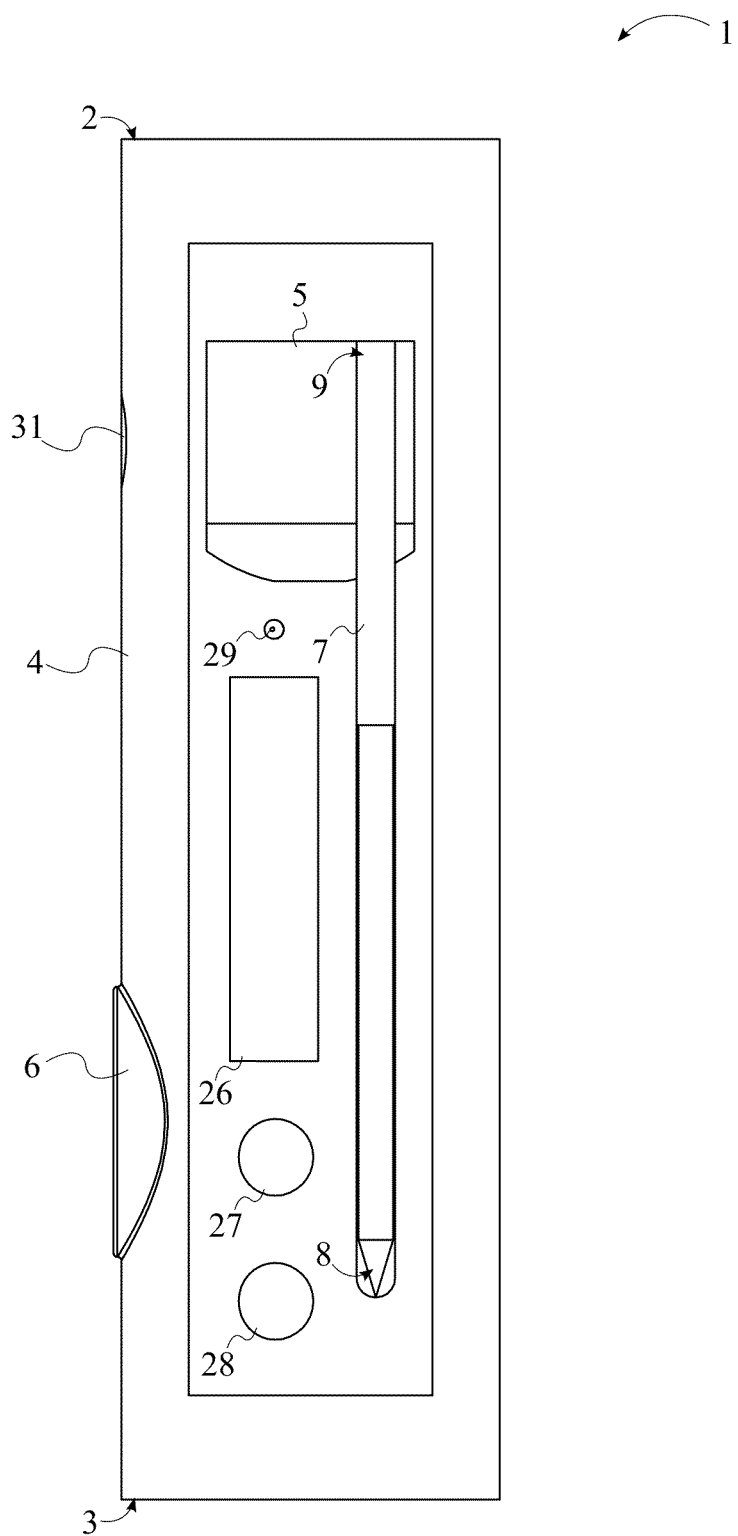
FIG. 8 is a left side view of the present invention.
Figure 9:
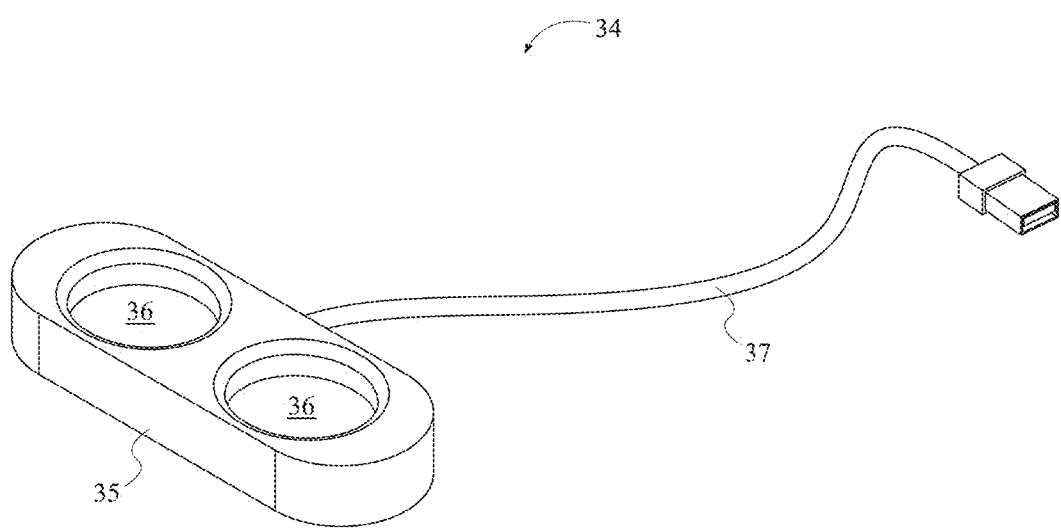
FIG. 9 is a top-front-left perspective view of the charging base of the present invention.
Figure 10:
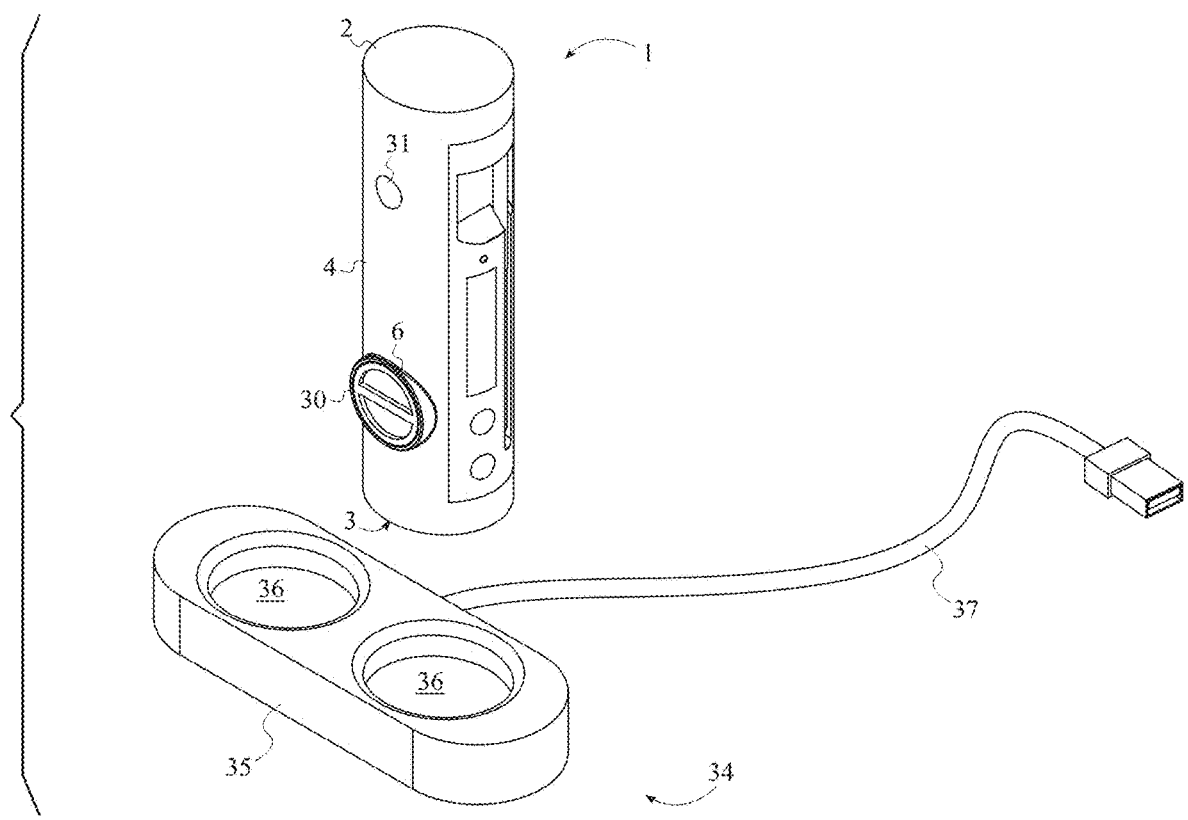
FIG. 10 is a top-front-left exploded perspective view of present invention, wherein the grinder housing is shown being mounted onto the charging base.
Figure 11:
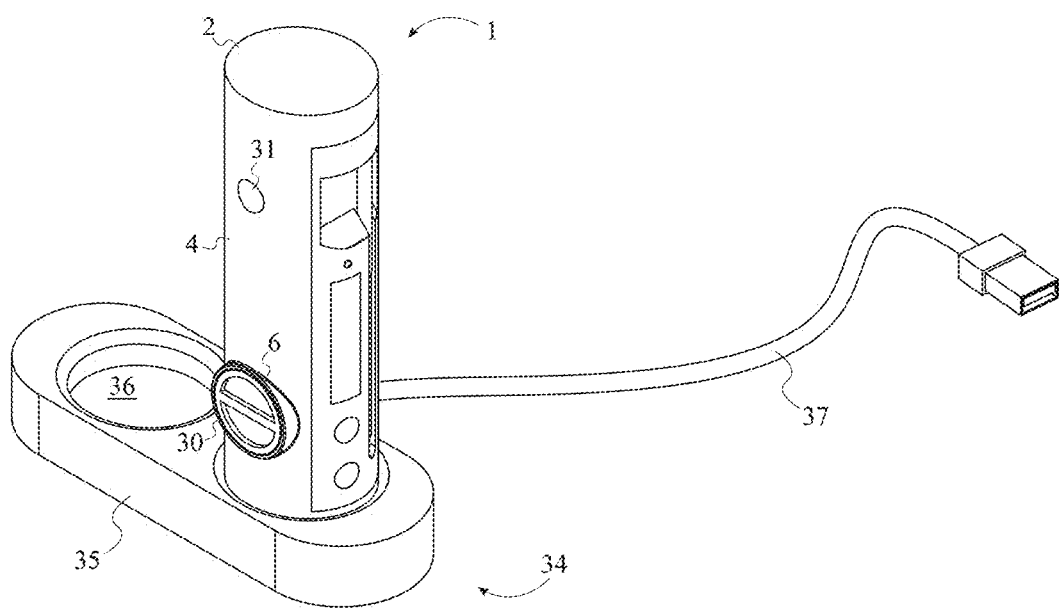
FIG. 11 is a top-front-left exploded perspective view of present invention, wherein the grinder housing is shown being mounted onto the charging base.
Figure 12:
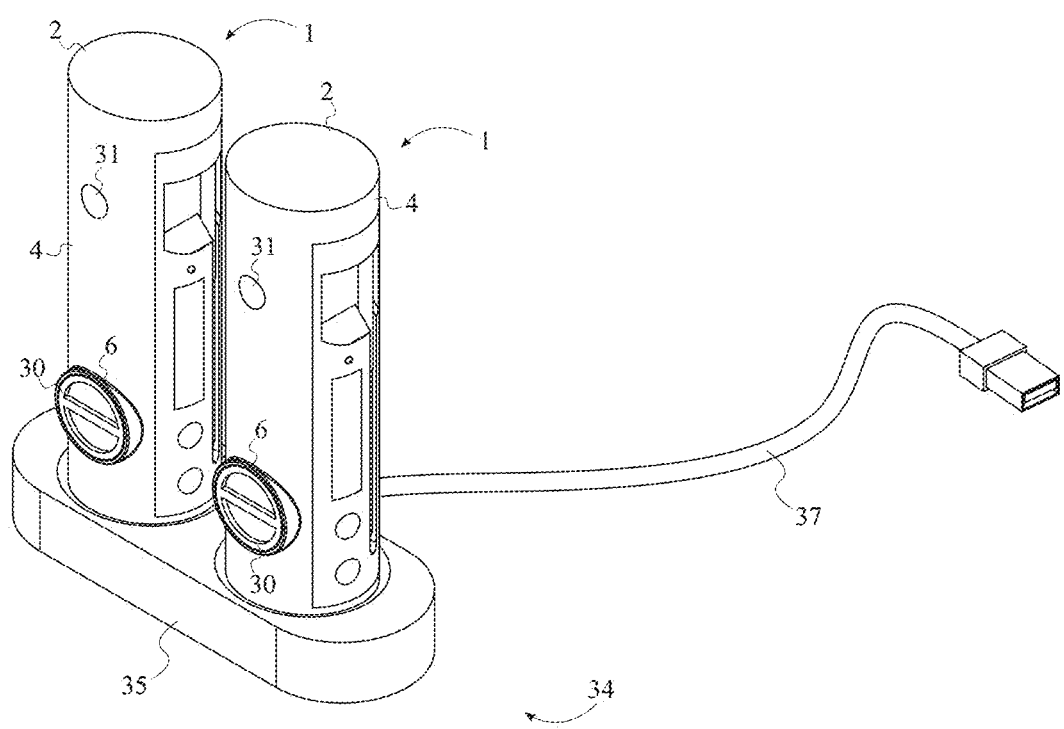
FIG. 12 is a top-front-left exploded perspective view of present invention, wherein two grinder housings are shown mounted onto the charging base.

All illustrations of the drawings are for the purpose of describing selected versions of the present invention and are not intended to limit the scope of the present invention.

The present invention discloses an electric spice grinder with digital thermometer. The present invention provides users with a device that dispenses milled spices automatically and includes a digital thermometer that can be used to monitor the temperature of food products being cooked. As can be seen in FIGS. 1 through 8 and 13, the present invention comprises a grinder housing 1, a food thermometer 7, a grinder mechanism 13, a portable power source 23, and a controller 24. The grinder housing 1 corresponds to the main structure of the present invention that houses the rest of the components in a portable and ergonomic way. The food thermometer 7 can be used to monitor the temperature of the desired food product separate from the grinder housing 1. The grinder mechanism 13 corresponds to the motorized mechanism that automatically dispenses a desired amount of milled spice at a desired grind level. The portable power source 23 provides the power necessary to sustain the automatic operation of the food thermometer 7, the grinder mechanism 13, and the controller 24. The controller 24 enables the user to selectively control the operation of the food thermometer 7 and the grinder mechanism 13.

The general configuration of the aforementioned components enables the user to more efficiently condiment and track the temperature of a desired food product using a single device. As can be seen in FIGS. 1 through 8 and 13, the grinder housing 1 is preferably a portable structure designed to be operated single-handedly or with two hands. For example, the grinder housing 1 can be an elongated tubular structure with a thinner end that can be used as the handle portion of the structure and a wider end from which the milled spice is dispensed. So, in general, the grinder housing 1 comprises a closed housing base 2, an open housing base 3, a housing lateral wall 4, and a thermometer slot 5. The closed housing base 2 and the open housing base 3 correspond to the opposite terminal bases of the grinder housing 1. The closed housing base 2 corresponds to the housing base adjacent to the portion of the grinder housing 1 where most of the electrical and electronic components are positioned. The open housing base 3 corresponds to the housing base through which the milled spices are dispensed. The portion of the grinder housing 1 adjacent to the open housing base 3 preferably stores the desired spices that can be grinded by the grinder mechanism 13. Further, the housing lateral wall 4 corresponds to the lateral structure of the grinder housing 1 that accommodates different control features. The thermometer slot 5 corresponds to the space that retains the food thermometer 7 when not in use.

As can be seen in FIGS. 1 through 8 and 13, the food thermometer 7 is preferably a digital thermometer that can be designed to monitor a wide range of temperatures while being exposed to high temperatures. This allows the food thermometer 7 to be used while cooking the desired food products. In addition, the food thermometer 7 preferably has an elongated design that can be inserted into the desired food product. So, the food thermometer 7 generally comprises a pointed thermometer end 8 and a graspable thermometer end 9 corresponding to the opposite terminal ends of the food thermometer 7. The pointed thermometer end 8 corresponds to the end of the food thermometer 7 that can be inserted into the desired food product. On the other hand, the graspable thermometer end 9 corresponds to the end of the food thermometer 7 that can be safely grabbed by the user when monitoring the temperature of the desired food product. Different materials can be implemented on the graspable thermometer end 9 to protect the user's hand from high temperatures. In other embodiments, the structure of the food thermometer 7 can be modified for specific applications.

In the preferred embodiment, the present invention can be arranged as follows: the closed housing base 2 is positioned opposite to the open housing base 3 about the housing lateral wall 4 due to the elongated design of the grinder housing 1, as can be seen in FIGS. 1 through 8 and 13. The controller 24 and the portable power source 23 are mounted within the grinder housing 1, adjacent to the closed housing base 2, to isolate the controller 24 and the portable power source 23 from the environment. In addition, the thermometer slot 5 is integrated into the housing lateral wall 4 to receive the food thermometer 7. The thermometer slot 5 is preferably aligned with the longitudinal axis of the grinder housing 1 so that the food thermometer 7 fits on the grinder housing 1 without obstructing the grinder mechanism 13. Further, the grinder mechanism 13 is operatively integrated into the open housing base 3 to incorporate the grinder mechanism 13 in the grinder housing 1. The grinder mechanism 13 is used to dispense a quantity of granular spice out of the open housing base 3. The quantity of granular spice can be predetermined amounts of spice that are dispensed in controlled intervals every time the user engages the grinder mechanism 13. The quantity of granular spice can be adjusted via the controller 24 so that the desired amount of spice is milled and dispensed.

Furthermore, as can be seen in FIGS. 1 through 8 and 13, the food thermometer 7 is detachably mounted into the thermometer slot 5 so that the user can retrieve the food thermometer 7 whenever necessary. Due to the elongated design of the food thermometer 7, the pointed thermometer end 8 and the graspable thermometer end 9 are positioned opposite to each other along the food thermometer 7. Further, the pointed thermometer end 8 is preferably positioned adjacent to the open housing base 3, while the graspable thermometer end 9 is positioned adjacent to the closed housing base 2. This way, the arrangement of the food thermometer 7 matches the design of the grinder housing 1 to facilitate the use of the present invention. Further, the food thermometer 7 is communicably coupled to the controller 24 so that the signals generated by the food thermometer 7 can be transmitted to the controller 24 for processing. The grinder mechanism 13 is also electronically connected to the controller 24 so that the operation of the grinder mechanism 13 can be adjusted via the controller 24. Furthermore, the grinder mechanism 13 and the controller 24 are electrically connected to the portable power source 23 to receive the power necessary for the operation of each component. In other embodiments, the arrangement of the components of the present invention can be altered to accommodate different designs of the grinder housing 1.

As previously discussed, the food thermometer 7 is preferably a detachable component to allow the safe monitoring of the temperature of the desired food product. As can be seen in FIGS. 1 through 8 and 13, to allow the recharging of the food thermometer 7, the present invention may further comprise a grinder induction coil 25 that allows for the wireless charging of the food thermometer 7. To enable the wireless charging of the food thermometer 7, the food thermometer 7 may comprise a thermometer housing 10, a thermometer battery 11, and a thermometer induction coil 12. To implement the grinder induction coil 25, the grinder induction coil 25 is mounted within the grinder housing 1, adjacent to the thermometer slot 5. This way, the grinder induction coil 25 is protected by the grinder housing 1. Further, the grinder induction coil 25 is electrically connected to the portable power source 23 to receive charge from the portable power source 23. On the other hand, the thermometer battery 11 and the thermometer induction coil 12 are mounted within the thermometer housing 10, adjacent to the grasping end, so that the thermometer battery 11 and the thermometer induction coil 12 are protected within the food thermometer 7. Further, the thermometer induction coil 12 is positioned adjacent to the grinder induction coil 25 to allow for the induction charging of the food thermometer 7 when the food thermometer 7 is placed within the thermometer slot 5. Furthermore, the thermometer induction coil 12 is electrically connected to the thermometer battery 11 to enable the food thermometer 7 to operate when removed from the grinder housing 1. In other embodiments, different charging mechanisms can be implemented, such as a direct wired connection between the food thermometer 7 and the grinder housing 1.

As can be seen in FIGS. 1 through 8 and 13, in some embodiments, the food thermometer 7 may include a digital display to visually indicate the food temperature measured using the food thermometer 7 so that the user can directly monitor the food temperature from the food thermometer 7. In other embodiments, the display can be implemented on the grinder housing 1 so that the user can monitor the food temperature from the grinder housing 1. In this embodiment, the present invention may further comprise a temperature display 26 designed to output in real time the temperature readings from the food thermometer 7. The temperature display 26 is preferably a digital display that outputs the temperature readings based on the thermometer signals transmitted by the food thermometer 7. To do so, the temperature display 26 is positioned adjacent to the thermometer slot 5 to not obstruct the operation of the grinder mechanism 13. The positioning of the temperature display 26 also facilitates the monitoring of the food temperature by maintaining the temperature display 26 in the same location from which the food thermometer 7 is retrieved. Further, the temperature display 26 is integrated onto the housing lateral wall 4 to incorporate the temperature display 26 into the grinder housing 1. Furthermore, the temperature display 26 is electronically connected to the controller 24 and electrically connected to the portable power source 23. This way, the temperature display 26 can be powered by the portable power source 23 and the operation can be controlled via the controller 24.

Due to the food thermometer 7 being a digital thermometer, different functions can be implemented to enhance the operation of the food thermometer 7. As can be seen in FIGS. 1 through 8 and 13, in one embodiment, the present invention may further comprise a hold button 27 that allows the user to hold onto a specific temperature reading while cooking the desired food product. The hold button 27 is preferably positioned adjacent to the thermometer slot 5 so that the hold button 27 is positioned adjacent to the temperature display 26. Further, the hold button 27 is integrated into the housing lateral wall 4 to incorporate the hold button 27 on the grinder housing 1. In addition, the hold button 27 is electronically connected to the controller 24 to generate the hold signal once the hold button 27 is pressed. This way, when the user presses the hold button 27 while monitoring the food temperature, the current temperature reading is continuously displayed on the temperature display 26.

In addition to the hold button 27, the present invention may further comprise a reset button 28 that resets the temperature reading on the temperature display 26 to a predetermined value, such as zero degrees. As can be seen in FIGS. 1 through 8 and 13, the reset button 28 is positioned adjacent to the thermometer slot 5. The reset button 28 can be provided adjacent to the hold button 27 for easy access by the user. In addition, the reset button 28 is integrated into the housing lateral wall 4 to incorporate the reset button 28 into the grinder housing 1. Further, the reset button 28 is electronically connected to the controller 24 to generate the reset signal once the reset button 28 is pressed. In other embodiments, different user interface features can be implemented that enhance the functionality of the present invention.

In some embodiments, the present invention may include means to monitor the temperature of the desired food product remotely. For example, the present invention may include an accompanying software application that allows the user to monitor the temperature readings of the food thermometer 7 from a separate computing device. The software application can be developed for different computing devices including, but not limited to, smartphones, tablet computers, laptops, desktops, etc. Further, the present invention may comprise a wireless module that allows the controller 24 to be communicably coupled with the wireless features of the computing device with the software application. For example, the smartphone with the software application can be paired with the present invention via the wireless module to enable the transmission of the temperature readings from the food thermometer 7. The wireless module is electronically connected to the controller 24 so that the processed signals from the controller 24 can be wirelessly transmitted to the user's computing device. Furthermore, the software app can include several functions that facilitate the cooking process of different food products. For example, the software application can include a current temperature function, a cooking time feature, etc. In alternate embodiments, different cooking features can be implemented into the software application.

As can be seen in FIGS. 1 through 8 and 13, the present invention includes means for the user to keep track of the operation of the different components. In some embodiments, the present invention may further comprise a thermometer indicator 29 that allows the user to monitor when the food thermometer 7 is activated. The thermometer indicator 29 can be one or more Light Emitting Diode (LEDs) or other appropriate light sources. The thermometer indicator 29 is positioned adjacent to the thermometer slot 5 to keep the thermometer indicator 29 adjacent to the temperature display 26. In addition, the thermometer indicator 29 is integrated into the housing lateral wall 4 to incorporate the thermometer indicator 29 into the grinder housing 1. Further, the thermometer indicator 29 is electronically connected to the controller 24 and is electrically connected to the portable power source 23. This way, the thermometer indicator 29 can activate when the food thermometer 7 is activated and is powered by the portable power source 23. In other embodiments, different indicators for other functions of the present invention can be implemented.

As previously discussed, the grinder mechanism 13 allows for a controlled amount of milled spices to be dispensed at periodical intervals. In addition, the grinder mechanism 13 allows the user to control the grind level of the milled spices being dispensed. As can be seen in FIGS. 1 through 8 and 13, the grinder mechanism 13 may comprise a motor 14, a grinder axle 17, a spring-loaded grinder wheel 20, an annular grinder base 21, and a gap-adjusting fastener 22. The motor 14 enables the automatic dispensing of the predetermined amount of milled spices. The grinder axle 17, the spring-loaded grinder wheel 20, and the annular grinder base 21 allow for the milling of the desired spices. The gap-adjusting fastener 22 allows the user to control the grind level of the milled spices being dispensed. Further, the motor 14 comprises a rotor 15 and a stator 16 corresponding to the rotating portion and the static portion of the motor 14. The grinder axle 17 also comprises a first axle end 18 and a second axle end 19 corresponding to the terminal ends of the grinder axle 17.

In the preferred embodiment, as can be seen in FIGS. 1 through 8 and 13, the grinder mechanism 13 can be implemented as follows: the stator 16 is mounted within the closed housing base 2 to secure the motor 14 within the grinder housing 1. The grinder axle 17, the spring-loaded grinder wheel 20, and the annular grinder base 21 are axially aligned to the rotor 15 so that the arrangement matches the overall tubular design of the grinder housing 1. Further, the annular grinder base 21 is mounted within the open housing base 3 to also secure the annular grinder base 21 within the grinder housing 1. The annular grinder base 21 corresponds to the structure against which the spices are grinded by the spring-loaded grinder wheel 20. In addition, the first axle end 18 is torsionally connected to the rotor 15 so that the motor 14 drives the rotation of the grinder axle 17. On the other, the second axle end 19 is positioned adjacent to the annular grinder base 21 to physically position the spring-loaded grinder wheel 20 adjacent to the annular grinder base 21.

As can be seen in FIGS. 1 through 8 and 13, the spring-loaded grinder wheel 20 is further enmeshed onto the annular grinder base 21, opposite to the motor 14, so that the spring-loaded grinder wheel 20 mills the spices that fall between the spring-loaded grinder wheel 20 and the annular grinder base 21. Furthermore, the spring-loaded grinder wheel 20 is torsionally connected to the second axle end 19 by the gap-adjusting fastener 22 so that the rotation of the grinder axle 17 drives the rotation of the spring-loaded grinder wheel 20. The gap-adjusting fastener 22 is preferably a fastener with an external lever that the user can manually rotate to engage the fastener in order to adjust the positioning of the spring-loaded grinder wheel 20 relative to the annular grinder base 21. For example, the tighter the user fastens the gap-adjusting fastener 22, the closer the spring-loaded grinder wheel 20 is positioned to the annular grinder base 21. This results in spices being milled and dispensed with a finer grind. On the other hand, the looser the user fastens the gap-adjusting fastener 22, the farther apart the spring-loaded grinder wheel 20 is positioned from the annular grinder base 21. This results in spices being milled and dispensed with a coarser grind.

In the preferred embodiment, the present invention can be used to dispensed different milled spices including, but not limited to, salt, pepper, etc. As can be seen in FIGS. 1 through 8 and 13, the grinder housing 1 is designed to retain a quantity of desired spices to automatically mill and dispense a predetermined amount of the spices when necessary. To allow the user to refill the quantity of spices within the grinder housing 1, the present invention may further comprise a refilling cap 30. In addition, the grinder housing 1 may further comprise a refilling opening 6 that accommodates the refilling cap 30 on the grinder housing 1. The refilling opening 6 is positioned offset from the closed housing base 2 to not expose the electronic and electrical components mounted within. In addition, the refilling opening 6 traverses into the housing lateral wall 4 to allow access into the interior of the grinder housing 1 adjacent to the open housing base 3. The space adjacent to the open housing base 3 can be altered to retain different amounts of spices within the grinder housing 1. Furthermore, the refilling cap 30 is mounted onto the refilling opening 6 to seal the refilling opening 6. This way, the user can remove the refilling cap 30 to refill the spices and then securely seal the refilling opening 6 to prevent the spices from falling out. In other embodiments, different refilling mechanisms can be implemented in the present invention.

As previously discussed, the present invention allows for the automatic dispensing of milled spices. As can be seen in FIGS. 1 through 8 and 13, to allow the user to control when the grinder mechanism 13 is engaged, the present invention may further comprise a power button 31. The power button 31 is a physical interface that allows the user to manually control when the grinder mechanism 13 is engaged to dispense a predetermined amount of milled spice. The power button 31 is preferably positioned adjacent to the closed housing base 2 so that the power button 31 can be pressed by a finger when the user grabs onto the grinder housing 1. In addition, the power button 31 is integrated into the housing lateral wall 4 to implement the power button 31 on the grinder housing 1. Further, the power button 31 is electrically connected to the controller 24 and is electrically connected to the portable power source 23. This way, when the user presses the power button 31, the grinder mechanism 13 is engaged under predetermined operational settings. In other embodiments, different control inputs can be implemented on the grinder housing 1 to allow the user to configure different operational settings of the present invention.

Figure 13:
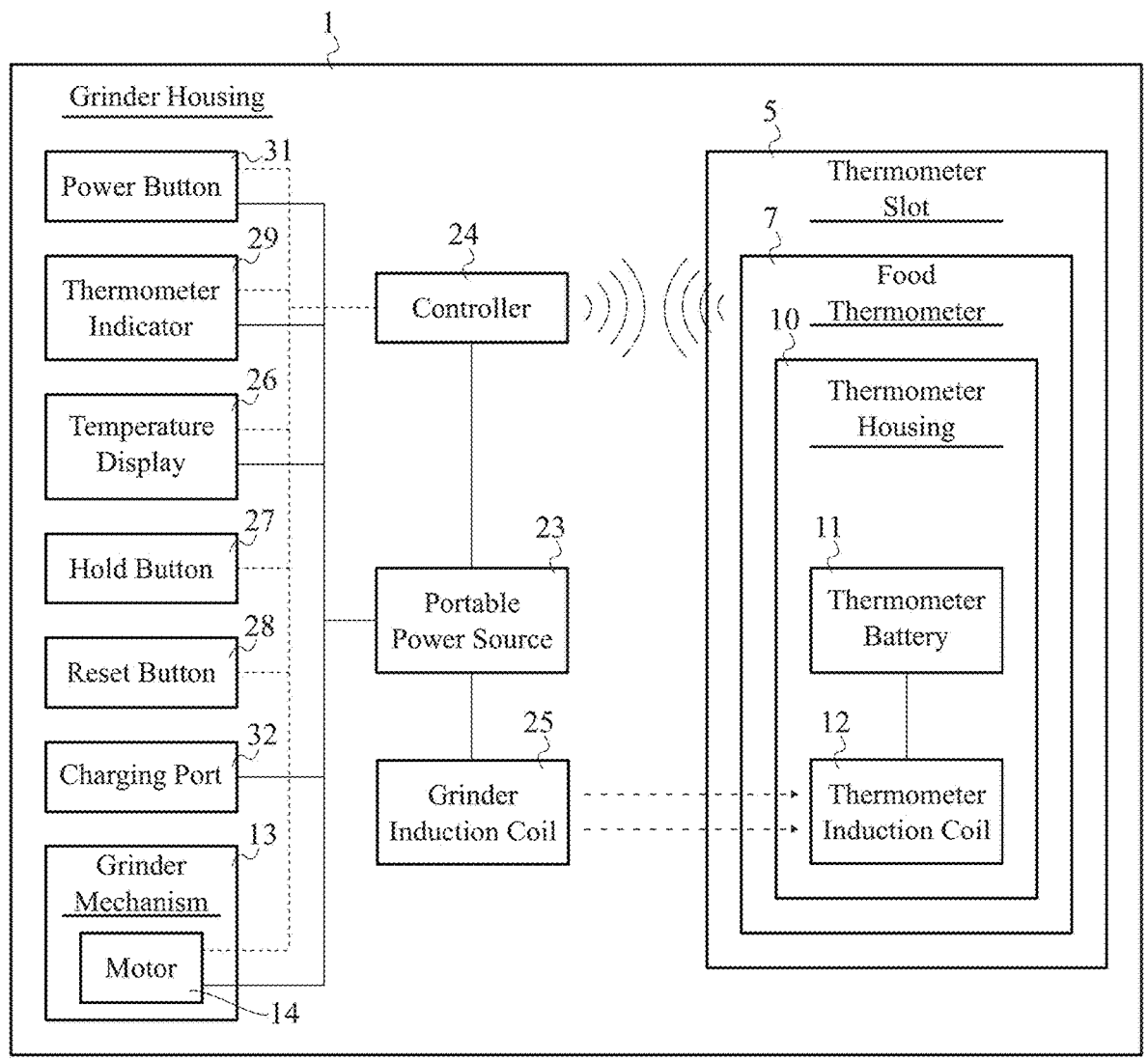
FIG. 13 is a box diagram showing the electronic connections, the electrical connections, the inductive coupling connections, and the wireless coupling connections of the present invention, wherein the electronic connections are shown in dashed lines, the electrical connections are shown in solid lines, the inductive coupling connections are shown in dashed arrows, and the wireless coupling connections are shown in dotted-dashed lines.
Figure 14:
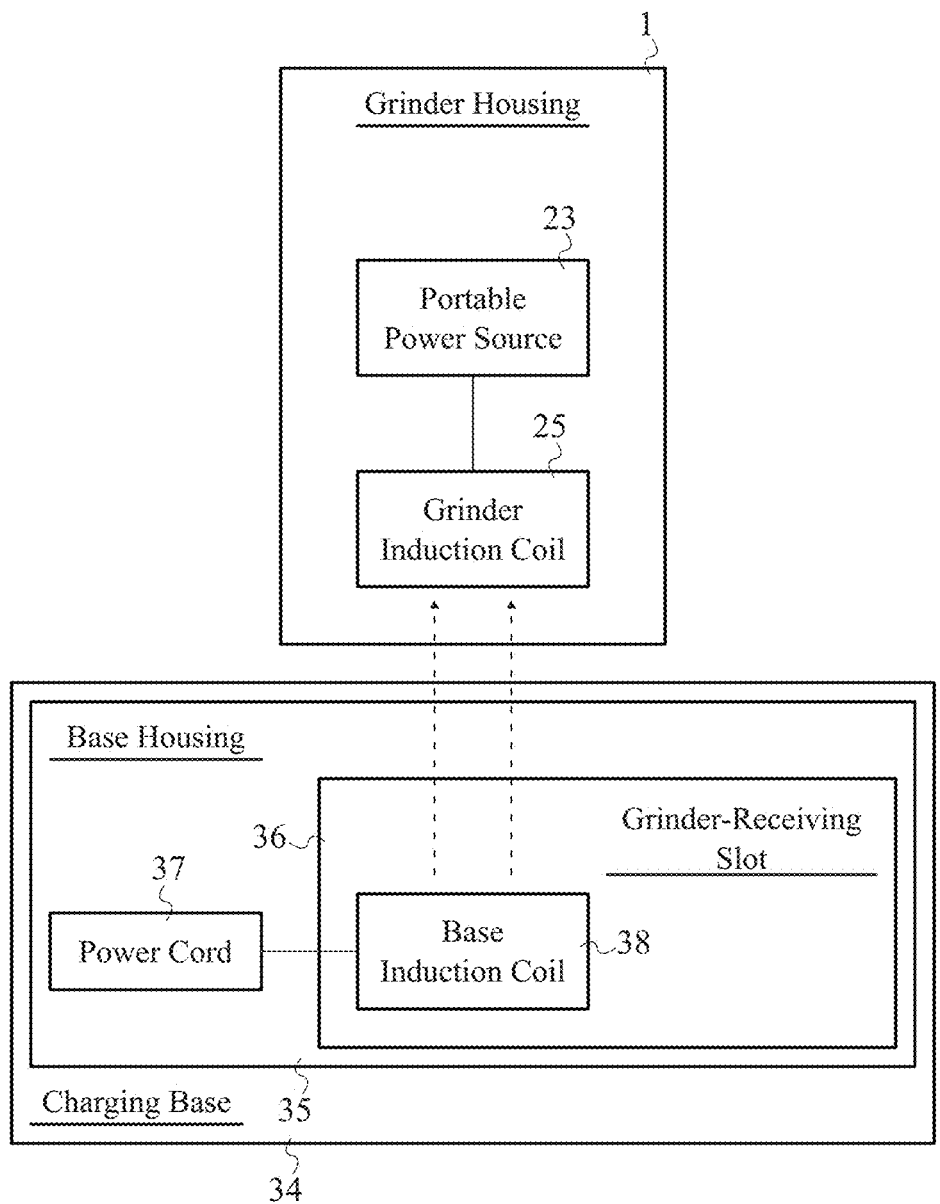
FIG. 14 is a box diagram showing the electrical connections and the inductive coupling connections of the grinder housing and the charging base of the present invention, wherein the electrical connections are shown in solid lines, and the inductive coupling connections are shown in dashed arrows.

The portable power source 23 allows the present invention to be freely used anywhere by retaining a charge to power the electrical and electronic components for a predetermined period of time. The portable power source 23 is preferably provided as a rechargeable battery to enable the continuous use of the present invention by recharging the portable power source 23. As can be seen in FIG. 13, the present invention may further comprise a charging port 32 that allows the temporary wire connection between the portable power source 23 and an external electric utility to recharge the portable power source 23. The charging port 32 is integrated into the housing lateral wall 4 to accommodate the appropriate power cable. For example, the power cable can be a Universal Serial Bus (USB) power cable and the charging port 32 can be the corresponding USB port. Further, the charging port 32 is electrically connected to the portable power source 23 to enable the current flow from the power cable to the portable power source 23.

In another embodiment, the portable power source 23 can be wirelessly charged using inductive charging. As can be seen in FIGS. 9 through 12 and 14, the present invention may further comprise a source induction coil 33 and a charging base 34. The charging base 34 corresponds to a separate structure that can retain the grinder housing 1 while charging. The charging base 34 may further comprise a base housing 35, a grinder-receiving slot 36, a power cord 37, and a base induction coil 38. The base housing 35 corresponds to the main structure of the charging base 34. The grinder-receiving slot 36 corresponds to the portion of the charging base 34 that accommodates the open housing base 3. The power cord 37 allows the charging base 34 to be connected to external electrical utilities. The source induction coil 33 and the base induction coil 38 enable the inductive charging of the portable power source 23.

In the preferred embodiment, the charging base 34 can be implemented as follows: the source induction coil 33 is mounted within the grinder housing 1, adjacent to the open housing base 3, so that the source induction coil 33 is protected by the grinder housing 1, as can be seen in FIGS. 9 through 12 and 14. The source induction coil 33 is also electrically connected to the portable power source 23 to relay the generated current to the portable power source 23. Further, the grinder-receiving slot 36 is integrated into the base housing 35 to form a space that accommodates the open housing base 3. In addition, the base induction coil 38 is mounted within the base housing 35, adjacent to the grinder-receiving slot 36, so that the base induction coil 38 is protected by the base housing 35. The base inducting coil is also electrically connected to the power cord 37 to generate a magnetic field that allows for the inductive charging to occur. Furthermore, the power cord 37 traverses out of the base housing 35 to allow the power cord 37 to be connected to the external electrical utilities. In other embodiments, the charging base 34 can be altered to accommodate several units of the present invention so that all the units can be simultaneously recharged.

Although the invention has been explained in relation to its preferred embodiment, it is to be understood that many other possible modifications and variations can be made without departing from the spirit and scope of the invention.

What is claimed is:

1. An electric spice grinder with digital thermometer comprising:
   a grinder housing;
   a food thermometer;
   a grinder mechanism;
   a portable power source;
   a controller;
   the grinder housing comprising a closed housing base, an open housing base, a housing lateral wall, and a thermometer slot;
   the food thermometer comprising a pointed thermometer end and a graspable thermometer end;
   the grinder mechanism comprising a motor, a grinder axle, a spring-loaded grinder wheel, an annular grinder base, and a gap-adjusting fastener;
   the motor comprising a rotor and a stator;
   the grinder axle comprising a first axle end and a second axle end;
   the closed housing base being positioned opposite to the open housing base about the housing lateral wall;
   the controller and the portable power source being mounted within the grinder housing, adjacent to the closed housing base;
   the thermometer slot being integrated into the housing lateral wall;
   the grinder mechanism being operatively integrated into the open housing base, wherein the grinder mechanism is used to dispense a quantity of granular spice out of the open housing base;
   the food thermometer being detachably mounted into the thermometer slot;
   the pointed thermometer end and the graspable thermometer end being positioned opposite to each other along the food thermometer;
   the pointed thermometer end being positioned adjacent to the open housing base;
   the graspable thermometer end being positioned adjacent to the closed housing base;
   the food thermometer being communicably coupled to the controller;
   the grinder mechanism being electronically connected to the controller;
   the grinder mechanism and the controller being electrically connected to the portable power source;
   the stator being mounted within to the closed housing base;
   the grinder axle, the spring-loaded grinder wheel, and the annular grinder base being axially aligned to the rotor;
   the annular grinder base being mounted within the open housing base;
   the first axle end being torsionally connected to the rotor;
   the second axle end being positioned adjacent to the annular grinder base;
   the spring-loaded grinder wheel being enmeshed onto the annular grinder base, opposite to the motor; and
   the spring-loaded grinder wheel being torsionally connected to the second axle end by the gap-adjusting fastener.

2. The electric spice grinder with digital thermometer as claimed in claim 1 further comprising:
   a grinder induction coil;
   the food thermometer comprising a thermometer housing, a thermometer battery, and a thermometer induction coil;
   the grinder induction coil being mounted within the grinder housing, adjacent to the thermometer slot;
   the grinder induction coil being electrically connected to the portable power source;
   the thermometer battery and the thermometer induction coil being mounted within the thermometer housing, adjacent to the grasping end;
   the thermometer induction coil being positioned adjacent to the grinder induction coil; and
   the thermometer induction coil being electrically connected to the thermometer battery.

3. The electric spice grinder with digital thermometer as claimed in claim 1 further comprising:
   a temperature display;
   the temperature display being positioned adjacent to the thermometer slot;
   the temperature display being integrated onto the housing lateral wall;
   the temperature display being electronically connected to the controller; and
   the temperature display being electrically connected to the portable power source.

4. The electric spice grinder with digital thermometer as claimed in claim 3 further comprising:
   a hold button;
   the hold button being positioned adjacent to the thermometer slot;
   the hold button being integrated into the housing lateral wall; and
   the hold button being electronically connected to the controller.

5. The electric spice grinder with digital thermometer as claimed in claim 3 further comprising:
   a reset button;
   the reset button being positioned adjacent to the thermometer slot;
   the reset button being integrated into the housing lateral wall; and
   the reset button being electronically connected to the controller.

6. The electric spice grinder with digital thermometer as claimed in claim 3 further comprising:
   a thermometer indicator;
   the thermometer indicator being positioned adjacent to the thermometer slot;
   the thermometer indicator being integrated into the housing lateral wall;
   the thermometer indicator being electronically connected to the controller; and
   the thermometer indicator being electrically connected to the portable power source.

7. The electric spice grinder with digital thermometer as claimed in claim 1 further comprising:
   a refilling cap;
   the grinder housing further comprising a refilling opening;
   the refilling opening being positioned offset from the closed housing base;
   the refilling opening traversing into the housing lateral wall; and
   the refilling cap being mounted onto the refilling opening.

8. The electric spice grinder with digital thermometer as claimed in claim 1 further comprising:
   a power button;
   the power button being positioned adjacent to the closed housing base;
   the power button being integrated into the housing lateral wall;
   the power button being electronically connected to the controller; and the power button being electrically connected to the portable power source.

9. The electric spice grinder with digital thermometer as claimed in claim 1 further comprising:
a charging port;
the charging port being integrated into the housing lateral wall; and
the charging port being electrically connected to the portable power source.

10. The electric spice grinder with digital thermometer as claimed in claim 1 further comprising:
a source induction coil;
a charging base;
the charging base comprising a base housing, a grinder-receiving slot, a power cord, and a base induction coil;
the source induction coil being mounted within the grinder housing, adjacent to the open housing base;
the source induction coil being electrically connected to the portable power source;
the grinder-receiving slot being integrated into the base housing;
the base induction coil being mounted within the base housing, adjacent to the grinder-receiving slot; and
the base inducting coil being electrically connected to the power cord;
the power cord traversing out of the base housing.

11. An electric spice grinder with digital thermometer comprising:
a grinder housing;
a food thermometer;
a grinder mechanism;
a portable power source;
a controller;
a temperature display;
a source induction coil;
a charging base;
the grinder housing comprising a closed housing base, an open housing base, a housing lateral wall, and a thermometer slot;
the food thermometer comprising a pointed thermometer end and a graspable thermometer end;
the charging base comprising a base housing, a grinder-receiving slot, a power cord, and a base induction coil;
the closed housing base being positioned opposite to the open housing base about the housing lateral wall;
the controller and the portable power source being mounted within the grinder housing, adjacent to the closed housing base;
the thermometer slot being integrated into the housing lateral wall;
the grinder mechanism being operatively integrated into the open housing base, wherein the grinder mechanism is used to dispense a quantity of granular spice out of the open housing base;
the food thermometer being detachably mounted into the thermometer slot;
the pointed thermometer end and the graspable thermometer end being positioned opposite to each other along the food thermometer;
the pointed thermometer end being positioned adjacent to the open housing base;
the graspable thermometer end being positioned adjacent to the closed housing base;
the temperature display being positioned adjacent to the thermometer slot;
the temperature display being integrated onto the housing lateral wall;
the food thermometer being communicably coupled to the controller;
the grinder mechanism and the temperature display being electronically connected to the controller;
the grinder mechanism, the controller, and the temperature display being electrically connected to the portable power source;
the source induction coil being mounted within the grinder housing, adjacent to the open housing base;
the source induction coil being electrically connected to the portable power source;
the grinder-receiving slot being integrated into the base housing;
the base induction coil being mounted within the base housing, adjacent to the grinder-receiving slot;
the base inducting coil being electrically connected to the power cord; and
the power cord traversing out of the base housing.

12. The electric spice grinder with digital thermometer as claimed in claim 11 further comprising:
a grinder induction coil;
the food thermometer comprising a thermometer housing, a thermometer battery, and a thermometer induction coil;
the grinder induction coil being mounted within the grinder housing, adjacent to the thermometer slot;
the grinder induction being electrically connected to the portable power source;
the thermometer battery and the thermometer induction coil being mounted within the thermometer housing, adjacent to the grasping end;
the thermometer induction coil being positioned adjacent to the grinder induction coil; and
the thermometer induction coil being electrically connected to the thermometer battery.

13. The electric spice grinder with digital thermometer as claimed in claim 11 further comprising:
a hold button;
a reset button;
the hold button and the reset button being positioned adjacent to the thermometer slot;
the hold button and the reset button being integrated into the housing lateral wall; and
the hold button and the reset button being electronically connected to the controller.

14. The electric spice grinder with digital thermometer as claimed in claim 11 further comprising:
a thermometer indicator;
the thermometer indicator being positioned adjacent to the thermometer slot;
the thermometer indicator being integrated into the housing lateral wall;
the thermometer indicator being electronically connected to the controller; and
the thermometer indicator being electrically connected to the portable power source.

15. The electric spice grinder with digital thermometer as claimed in claim 11 further comprising:
the grinder mechanism comprising a motor, a grinder axle, a spring-loaded grinder wheel, an annular grinder base, and a gap-adjusting fastener;
the motor comprising a rotor and a stator;
the grinder axle comprising a first axle end and a second axle end;
the stator being mounted within to the closed housing base;

the grinder axle, the spring-loaded grinder wheel, and the annular grinder base being axially aligned to the rotor;

the annular grinder base being mounted within the open housing base;

the first axle end being torsionally connected to the rotor;

the second axle end being positioned adjacent to the annular grinder base;

the spring-loaded grinder wheel being enmeshed onto the annular grinder base, opposite to the motor; and the spring-loaded grinder wheel being torsionally connected to the second axle end by the gap-adjusting fastener.

16. The electric spice grinder with digital thermometer as claimed in claim 11 further comprising:

a refilling cap;

the grinder housing further comprising a refilling opening;

the refilling opening being positioned offset from the closed housing base;

the refilling opening traversing into the housing lateral wall; and the refilling cap being mounted onto the refilling opening.

17. The electric spice grinder with digital thermometer as claimed in claim 11 further comprising:

a power button;

the power button being positioned adjacent to the closed housing base;

the power button being integrated into the housing lateral wall;

the power button being electronically connected to the controller; and the power button being electrically connected to the portable power source.

18. The electric spice grinder with digital thermometer as claimed in claim 11 further comprising:

a charging port;

the charging port being integrated into the housing lateral wall; and the charging port being electrically connected to the portable power source.

* * * * *